United States Patent
Jones et al.

(10) Patent No.: US 7,334,140 B2
(45) Date of Patent: Feb. 19, 2008

(54) APPARATUS AND METHOD TO SELECTIVELY PROVIDE POWER TO ONE OR MORE COMPONENTS DISPOSED IN AN INFORMATION STORAGE AND RETRIEVAL SYSTEM

(75) Inventors: Carl E. Jones, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/073,270

(22) Filed: Mar. 3, 2005

(65) Prior Publication Data

US 2006/0200685 A1 Sep. 7, 2006

(51) Int. Cl.
G06F 1/26 (2006.01)
(52) U.S. Cl. .................. 713/300; 713/320; 713/324
(58) Field of Classification Search ......... 713/300–375
See application file for complete search history.

(56) References Cited

U.S. PATENT DOCUMENTS

| | | | |
|---|---|---|---|
| 4,639,864 A | 1/1987 | Katzman et al. | |
| 5,579,524 A | 11/1996 | Kikinis | |
| 5,664,089 A | 9/1997 | Byers et al. | |
| 5,719,800 A * | 2/1998 | Mittal et al. | 713/321 |
| 5,996,083 A * | 11/1999 | Gupta et al. | 713/322 |
| 6,202,171 B1 | 3/2001 | Townsley et al. | |
| 6,452,794 B1 | 9/2002 | Rumney | |
| 6,539,460 B2 * | 3/2003 | Castelli et al. | 711/154 |
| 2003/0065958 A1 | 4/2003 | Hansen et al. | |

* cited by examiner

*Primary Examiner*—James K. Trusillo
*Assistant Examiner*—Paul Yanchus
(74) *Attorney, Agent, or Firm*—Chandler & Udall, LLP; Dale F. Regelman

(57) ABSTRACT

A method is disclosed to selectively provide power to a component disposed in an information storage and retrieval system. Applicants' method supplies a controller comprising a control portion in combination with a plurality of components comprising one or more host adapters, one or more device adapter ports, and a Fibre Channel switch. The method monitors the performance of each of those components. The method discontinues the supply of power to first component while continuing to provide power to the remaining plurality of components. The method then resumes providing power to the first component while continuing the supply of power to the remaining plurality of components.

2 Claims, 7 Drawing Sheets

APPARATUS AND METHOD TO SELECTIVELY PROVIDE POWER TO ONE OR MORE COMPONENTS DISPOSED IN AN INFORMATION STORAGE AND RETRIEVAL SYSTEM

FIELD OF THE INVENTION

This invention relates to an apparatus and method to selectively provide power to one or more components disposed in an information storage and retrieval system.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

One or more controllers coordinate receipt of information from one or more host computers, and the movement of information to and from the data cache and storage devices. What is needed is an apparatus and method to selectively provide power to one or more of those components disposed in the one or more controllers. In certain embodiments, Applicants' apparatus and invention are capable of selectively resetting one or more of components disposed in the one or more controllers.

SUMMARY OF THE INVENTION

Applicants' invention comprises an apparatus and method to selectively control the supply of power to a component disposed in an information storage and retrieval system. Applicants' method supplies a controller comprising a control portion in combination with a plurality of components comprising one or more host adapter ports, one or more device adapter ports, and a Fibre Channel switch. The method monitors the performance of each of the plurality of components. If the method discontinues the supply of power to a first component while continuing the supply of power to the remaining plurality of components, and then resumes the supply of power to the first component while continuing the supply of power to the remaining plurality of components.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapter ports, a plurality of device adapter ports, and a data cache.

Figure 1:
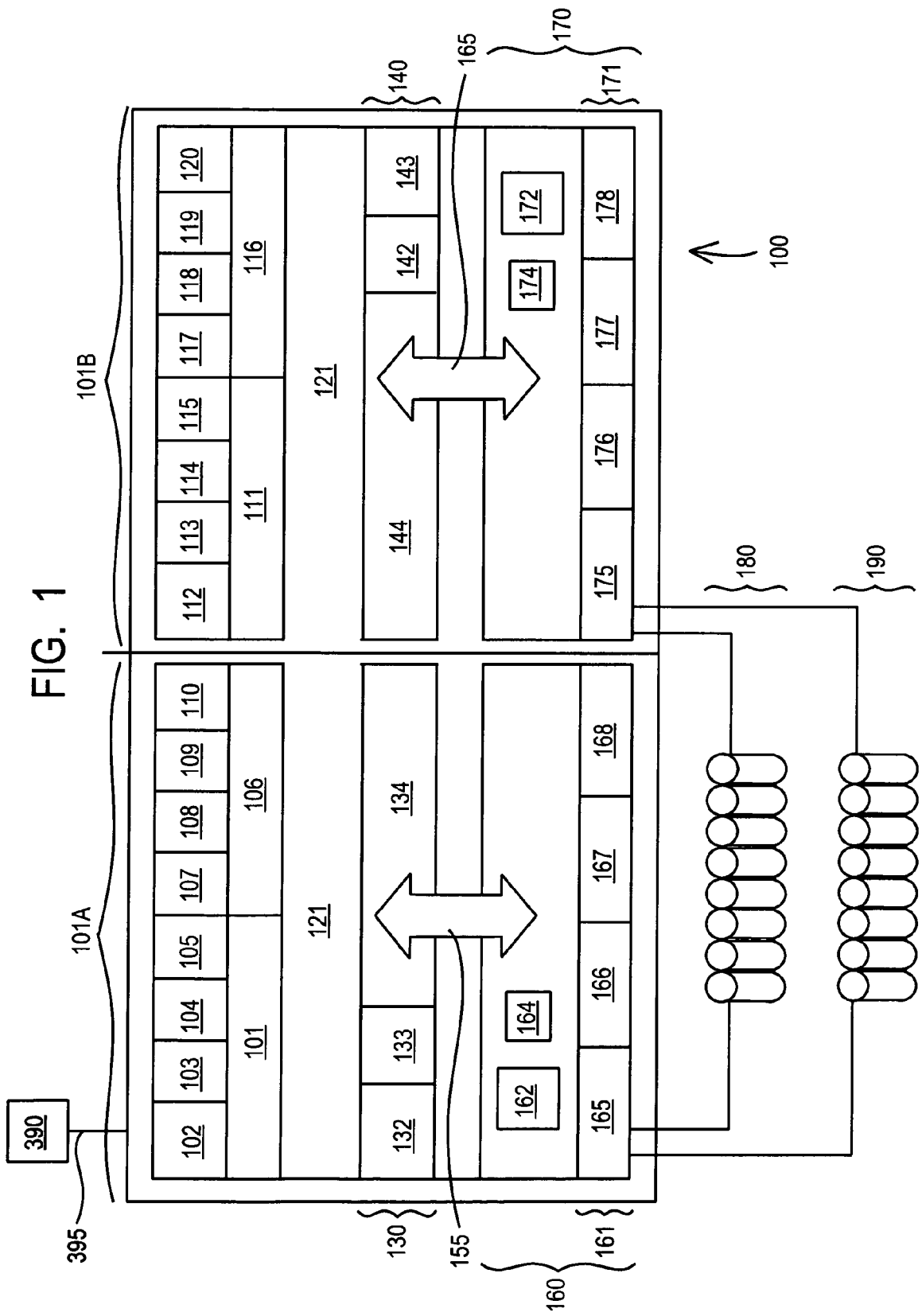
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapter ports 101 and 106 which includes adapters 102-105 and 107-110; and a second plurality of host adapter ports 111 and 116 which includes adapters 112-115 and 117-120. In other embodiments, Applicants' information storage and retrieval system includes fewer than 16 host adapter ports. Regardless of the number of host adapter ports disposed in any embodiments of Applicants' system, each of those host adapter ports comprises a shared resource that has equal access to both central processing/cache elements 130 and 140. Each host adapter port may comprise one or more Fibre Channel ports, one or more FICON ports, one or more ESCON ports, or one or more SCSI ports. Each host adapter port is connected to both clusters through interconnect bus 121 such that each cluster can handle I/O from any host adapter port.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapter ports 161 which in the illustrated embodiment of FIG. 1 comprises device adapter ports 165, 166, 167, and 168. I/O portion 160 further comprise nonvolatile storage ("NVS") 162 and battery backup 164 for NVS 162.

I/O portion 170 comprises a plurality of device adapter ports 171 which in the illustrated embodiment of FIG. 1 comprises device adapter ports 175, 176, 177, and 178. I/O portion 170 further comprise nonvolatile storage ("NVS") 172 and battery backup 174 for NVS 172.

Figure 4:
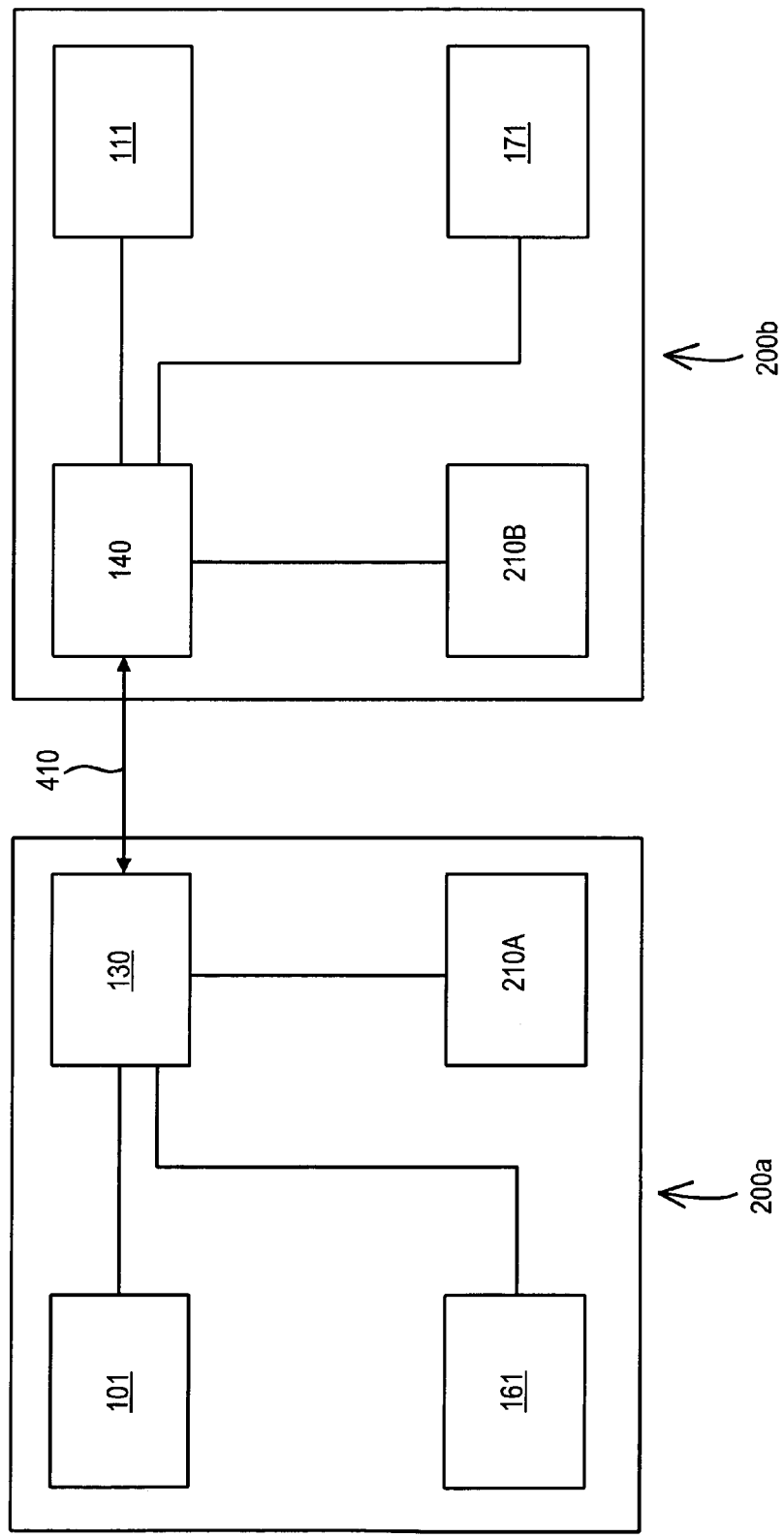
FIG. 4 is a block diagram showing two interconnected controllers of FIG. 3.

In certain embodiments of Applicants' system, one or more host adapter ports, processor portion 130, and one or more device adapter ports, are packaged together on a single card, such as controller 200a (FIG. 4) disposed in Applicants' information storage and retrieval system. Similarly, in certain embodiments, one or more host adapter ports, processor portion 160, and one or more device adapter ports, are disposed on a second card, such as controller 200b (FIG. 4), disposed in Applicants' information storage and retrieval system. In these embodiments, Applicants' system 100 includes two cards, such as controllers 200A (FIG. 4) and 200B (FIG. 4) interconnected by a communication link, such as link 410 (FIG. 4).

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
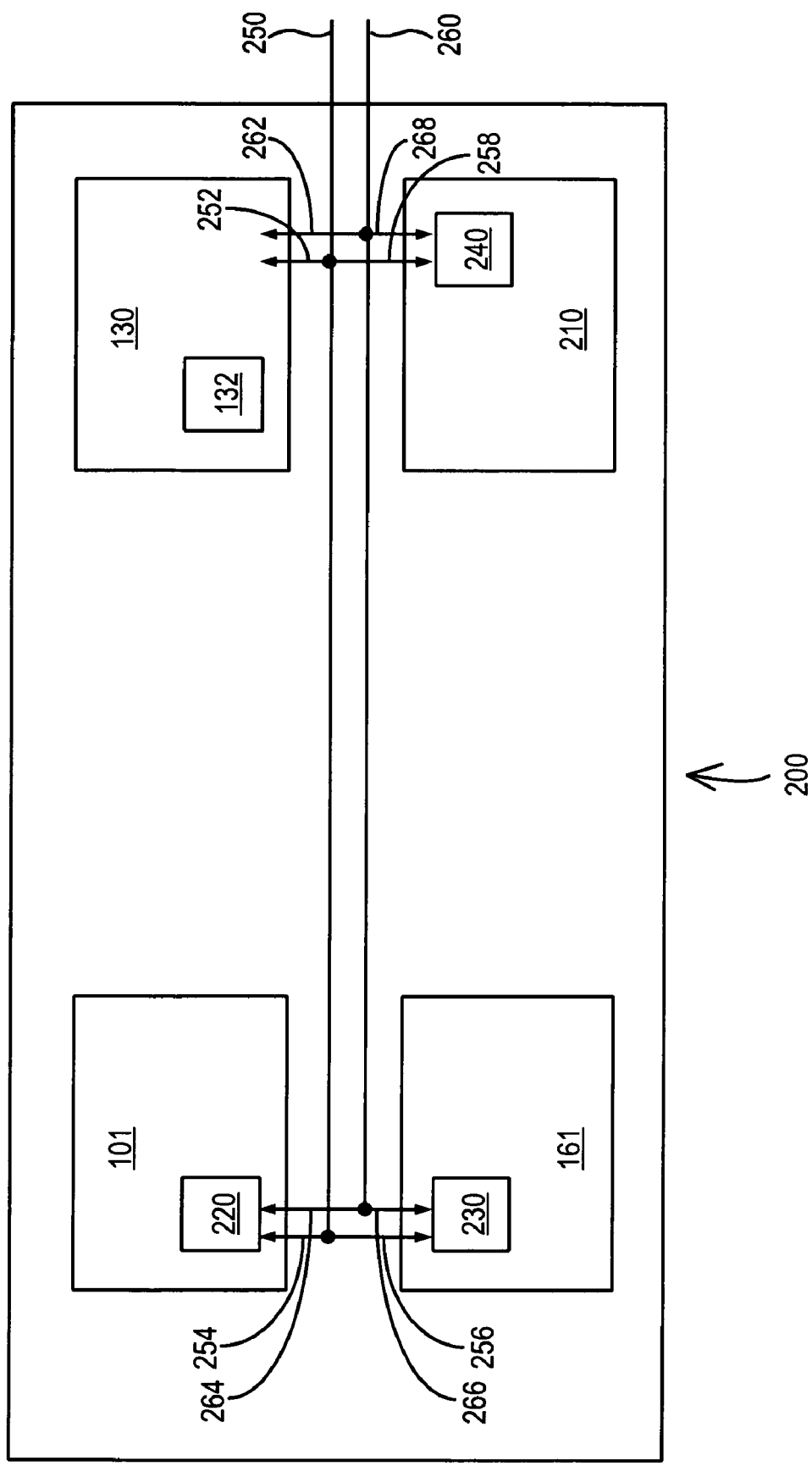
FIG. 2 is a block diagram showing certain power buses disposed in Applicants' controller.

Referring now to FIG. 2, controller 200 receives power from a first power bus 250 and a second power bus 260. In certain embodiments, power bus 250 provides 12 volt DC power. In certain embodiments, power bus 260 provides 3.3 volt DC power.

The plurality of host adapter ports 101 includes a power regulator 220 which regulates the power supplied to each of the host adapter ports comprising a plurality of host adapter ports 101. Power regulator 220 is interconnected with power bus 250 by power conduit 254. Power regulator 220 is interconnected with power bus 260 by power conduit 264.

The plurality of device adapter ports 161 includes a power regulator 230 which regulates the power supplied to each of the device adapter ports comprising plurality of device adapter ports 161. Power regulator 230 is interconnected with power bus 250 by power conduit 256. Power regulator 230 is interconnected with power bus 260 by power conduit 266.

Control portion 130 is interconnected with power bus 250 via power conduit 252. Control portion 130 is interconnected with power bus 260 via power conduit 262. Fibre Channel switch 210 includes power regulator 240. Power regulator 240 is interconnected with power bus 250 via power conduit 258. Power regulator 240 is interconnected with power bus 260 via power conduit 268.

Figure 3:
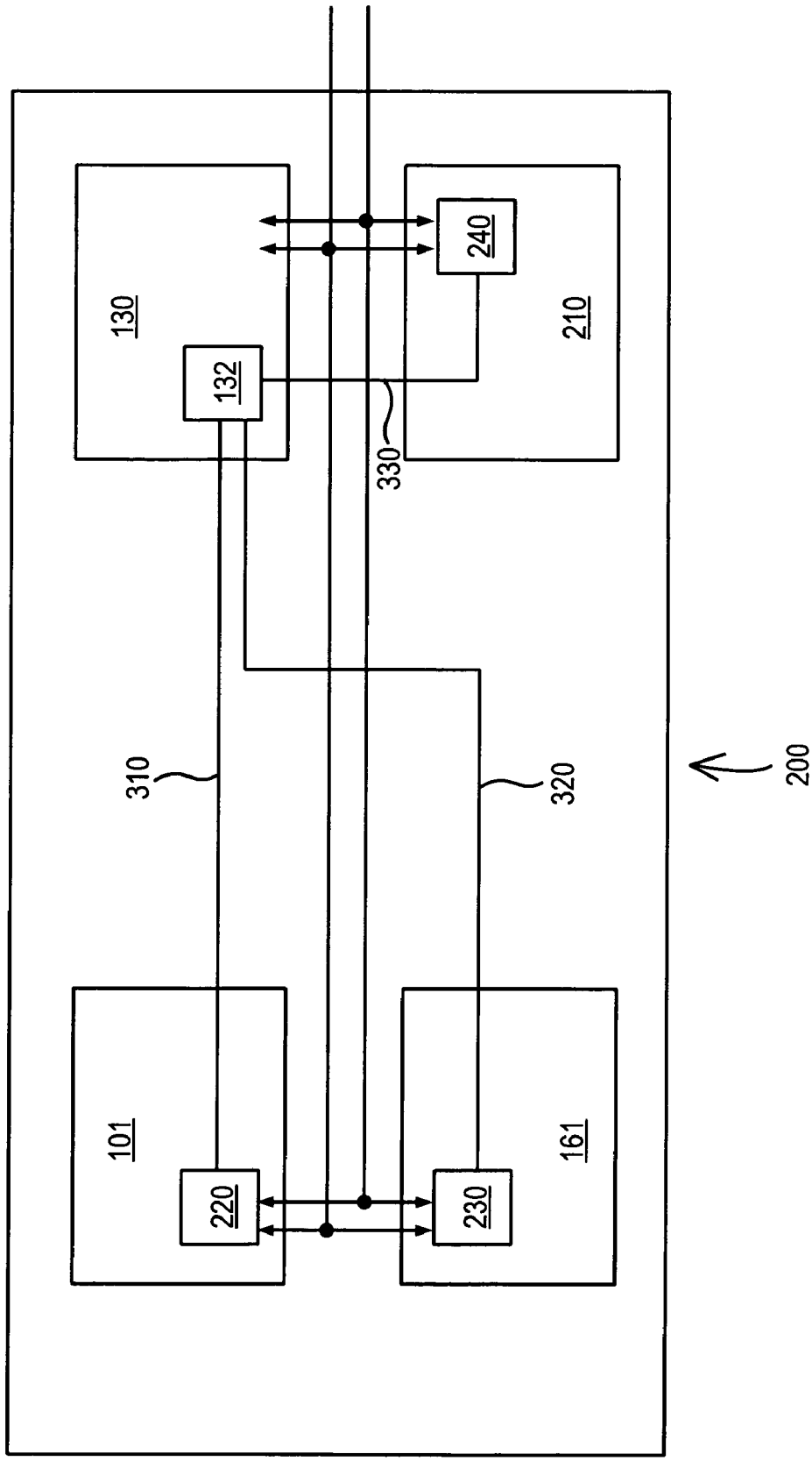
FIG. 3 is a block diagram showing certain communication links disposed in the controller of FIG. 2.

Referring to FIG. 3, communication link 310 interconnects processor 132 and power regulator 220. Communication link 320 interconnects processor 132 and power regulator 230. Communication link 330 interconnects processor 132 and power regulator 240.

The supply of power to plurality of host adapter ports 101 via power bus 250 and/or power bus 260 can be discontinued and subsequently resumed independent of control portion 130, plurality of device adapter ports 161, and Fibre Channel switch 210. In certain embodiments of Applicants' method, processor 132 causes power regulator 220 to discontinue the supply of power from power bus 250 and/or power bus 260 to plurality of host adapter ports 101, while power regulators 230 and 240 continue to supply power from power bus 250 and/or power bus 260 to plurality of device adapter ports 161 and Fibre Channel switch 210, respectively, and while control portion 130 continues to receive power from power bus 250 and/or 260.

Figure 5:
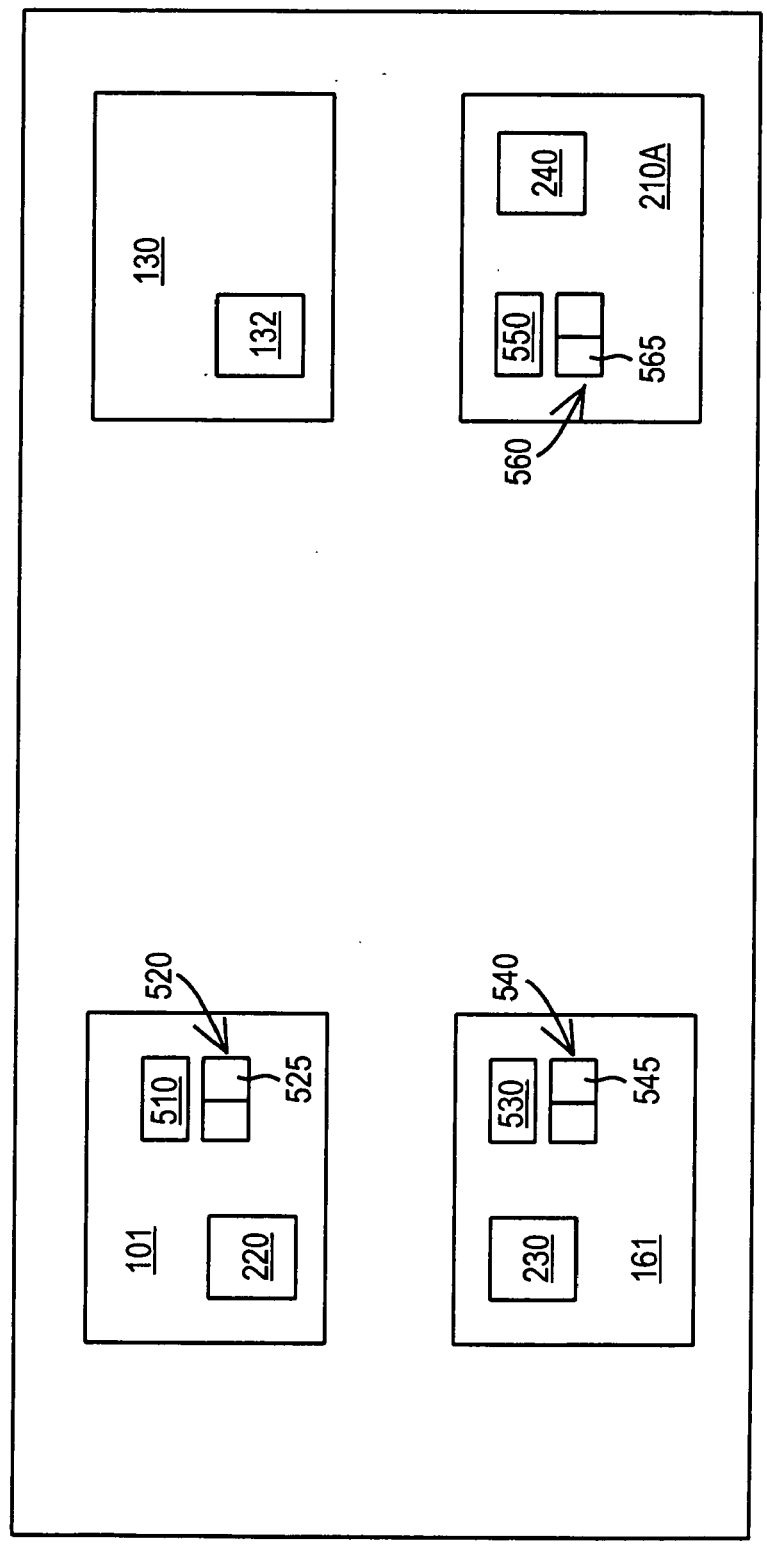
FIG. 5 is a block diagram showing certain microcode and memory registers disposed in the controller of FIG. 3.

Referring to FIG. 5, plurality of host adapter ports 101 includes device 510 and optionally nonvolatile memory device 520. In certain embodiments, each device adapter port comprising the plurality of device adapter ports 101 comprises a device 510, and optionally a nonvolatile memory device 520. In certain embodiments, device 510 comprises a programmable logic device ("PLD"). In certain embodiments, device 510 comprises a field programmable gate array ("FPGA"). In certain embodiments, memory device 520 comprises an EEPROM.

When power is discontinued to a plurality of host adapter ports 101, the logic configuration disposed in FPGA 510 is cleared. When the supply of power to plurality of host adapter ports 101 is resumed, each FPGA disposed in a host adapter port, such as FPGA 510, reloads a volatile logic configuration automatically by reading configuration data 525 from an external non-volatile memory, such as EEPROM device 520.

As those skilled in the art will appreciate, discontinuing power to a host adapter port, clearing the logic configuration loaded in a FPGA disposed in that host adapter port, resuming power to that host adapter port, and reloading a logic configuration into FPGA 510, comprises a power on reset of the host adapter port.

The supply of power to plurality of device adapter ports 161 via power bus 250 and/or power bus 260 can be discontinued, and subsequently resumed, independent of control portion 130, plurality of host adapter ports 101, and Fibre Channel switch 210. In certain embodiments of Applicants' method, processor 132 causes power regulator 230 to discontinue the supply of power from power bus 250 and/or power bus 260 to plurality of device adapter ports 161, while power regulators 220 and 240 continue to supply power from power bus 250 and/or power bus 260 to plurality of host adapter ports 101 and Fibre Channel switch 210, respectively, and while control portion 130 continues to receive power from power bus 250 and/or 260.

Referring to FIG. 5, plurality of device adapter ports 161 includes device 530 and optionally nonvolatile memory device 540. In certain embodiments, device 530 comprises a programmable logic device ("PLD"). In certain embodiments, device 530 comprises a field programmable gate array ("FPGA"). In certain embodiments, each host adapter port comprising that plurality of device adapter ports 161 comprises device 530, and optionally a nonvolatile memory device 540. In certain embodiments, memory device 540 comprises an EEPROM.

When power is discontinued to a plurality of device adapter ports 161, the logic configuration disposed in FPGA 530 is cleared. When the supply of power to plurality of device adapter ports 161 is resumed, each FPGA disposed in a device adapter port, such as FPGA 530, reloads a volatile logic configuration automatically by reading configuration data 545 from an external non-volatile memory, such as EEPROM device 540.

As those skilled in the art will appreciate, discontinuing power to a device adapter port, clearing the logic configuration loaded in a FPGA disposed in that device adapter port, resuming power to that device adapter port, and reloading a logic configuration into FPGA 530, comprises a power on reset of the host adapter port.

The supply of power to Fibre Channel switch 210 via power bus 250 and/or power bus 260 can be discontinued, and subsequently resumed, independent of control portion 130, plurality of host adapter ports 101, and plurality of device adapter ports 161. In certain embodiments of Applicants' method, processor 132 causes power regulator 240 to discontinue the supply of power from power bus 250 and/or power bus 260 to Fibre Channel switch 210, while power regulators 220 and 230 continue to supply power from power bus 250 and/or power bus 260 to plurality of host adapter ports 101 and plurality of device adapter ports 161, respectively, and while control portion 130 continues to receive power from power bus 250 and/or 260.

Referring to FIG. 5, Fibre Channel switch 210 includes device 550 and optionally nonvolatile memory device 560. In certain embodiments, device 550 comprises a programmable logic device ("PLD"). In certain embodiments, device 550 comprises a field programmable gate array ("FPGA"). In certain embodiments, memory device 540 comprises an EEPROM.

When power is discontinued to Fibre Channel switch 210, the logic configuration disposed in FPGA 550 is cleared. When the supply of power to Fibre Channel switch 210 is resumed, each FPGA disposed in Fibre Channel switch 210, such as FPGA 550, reloads a volatile logic configuration automatically by reading configuration data 565 from an external non-volatile memory, such as EEPROM device 560.

As those skilled in the art will appreciate, discontinuing power to Fibre Channel Twitch 210, clearing the logic configuration loaded in a FPGA disposed in Fibre Channel switch 210, resuming power to Fibre Channel switch 210, and reloading a logic configuration into FPGA 550, comprises a power on reset of Fibre Channel switch 210.

Figure 6:
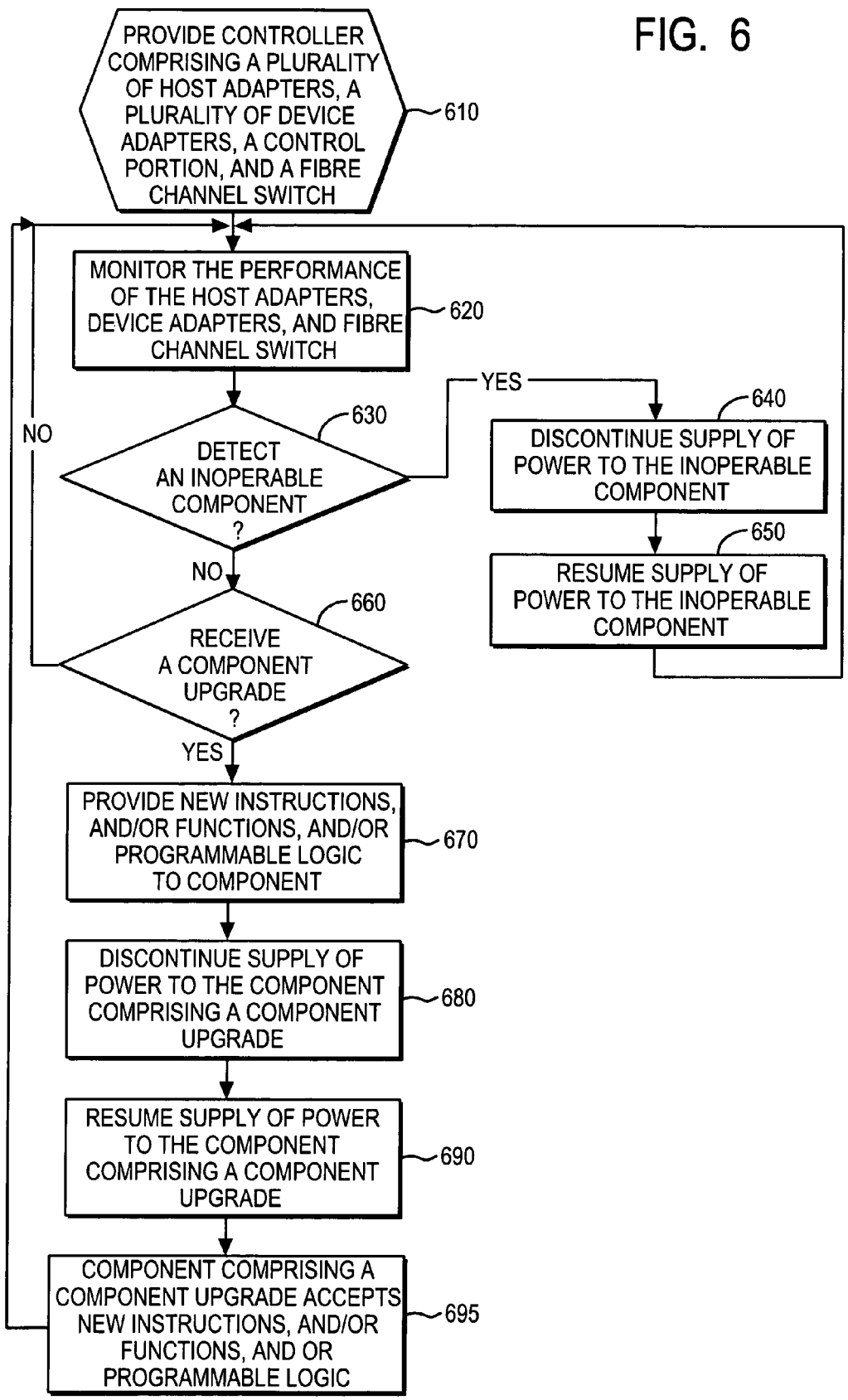
FIG. 6 is a flow chart summarizing the steps of one embodiment of Applicants' method.

Applicants' invention includes a method to monitor the performance of the components comprising controller 200, and selectively resetting one or more of those components while keeping the remaining components in service. Referring now to FIG. 6, in step 610 Applicants' method provides a controller, such as controller 200 (FIGS. 2, 3, 4, 5), comprising a plurality of host adapter ports, a plurality of device adapter port ports, a control portion, and a Fibre Channel switch.

In step 620, Applicants' method monitors the performance of the components comprising the controller. In certain embodiments, step 620 is performed by a processor, such as processor 132 (FIGS. 1, 3, 4, 5), disposed in the controller, such as controller 200. In certain embodiments, step 620 is performed by a host computer, such as host computer 390 (FIG. 1).

In step 630, Applicants' method detects an inoperable component. As those skilled in the art will appreciate, each of the plurality of components comprising Applicants' controller has predetermined performance specifications, e.g. the nominal performance specifications. By "inoperable component," Applicants' mean a component that is not achieving its nominal performance specifications. For the purposes of this application, an inoperable component is not necessarily a failed component.

In certain embodiments, step 630 is performed by a processor, such as processor 132 (FIGS. 1, 3, 4, 5), disposed in the controller, such as controller 200. In certain embodiments, step 630 is performed by a host computer, such as host computer 390 (FIG. 1).

If Applicants' method detects an inoperable component problem in step 630, Applicants' method transitions from step 630 to step 640 wherein the method discontinues the supply of power to the inoperable component. In certain embodiments, step 640 further comprises generating a power disconnect signal by the control portion, and providing that power disconnect signal to the power regulator disposed in the inoperable component. In certain embodiments, step 640 is performed by a processor, such as processor 132 (FIGS. 1, 3, 4, 5), disposed in the controller, such as controller 200. In certain embodiments, step 640 includes providing a signal from a host computer, such as host computer 390 (FIG. 1), to the local processor, such as processor 132, to discontinue the supply of power to the inoperable component.

Applicants' method transitions from step 640 to step 650 wherein the method resumes the supply of power to the inoperable component. In certain embodiments, step 650 further comprises generating a power connect signal by the control portion, and providing that power connect signal to the power regulator disposed in the inoperable component. In certain embodiments, step 650 is performed by a processor, such as processor 132 (FIGS. 1, 3, 4, 5), disposed in the controller, such as controller 200. In certain embodiments, step 650 includes providing a signal from a host computer, such as host computer 390 (FIG. 1), to the local processor, such as processor 132, to resume the supply of power to the inoperable component.

In certain embodiments, the inoperable component comprises a field programmable gate array and a nonvolatile memory device. In these embodiments, step 650 further comprises reading logic configuration data disposed in the memory device, and loading a logic configuration into the field programmable gate array. Applicants' method transitions from step 650 to step 620 and continues as described herein.

If Applicants' method does not detect an inoperable component in step 630, Applicants' method transitions from step 630 to step 660 wherein the method determines if a component microcode upgrade has been received. In certain embodiments, step 660 is performed by a processor, such as processor 132 (FIGS. 1, 3, 4, 5), disposed in the controller, such as controller 200.

If Applicants' method determines that a component microcode upgrade has been received in step 660, Applicants' method transitions from step 660 to step 670 wherein the method provides new instructions, and/or functions, and/or microcode, to the designated component disposed in the controller. In certain embodiments, step 670 is performed by a processor, such as processor 132 (FIGS. 1, 3, 4, 5), disposed in the controller, such as controller 200. In certain embodiments, step 670 is performed by a host computer, such as host computer 390 (FIG. 1).

Applicants' method transitions from step 670 to step 680 wherein the method discontinues the supply of power to the component comprising the component upgrade. In certain embodiments, step 680 further comprises generating a power disconnect signal by the control portion, and providing that power disconnect signal to the power regulator disposed in the component comprising the component upgrade. In certain embodiments, step 680 is performed by a processor, such as processor 132 (FIGS. 1, 3, 4, 5), disposed in the controller, such as controller 200. In certain embodiments, step 680 includes providing a signal from a host computer, such as host computer 390 (FIG. 1), to the local processor, such as processor 132, to discontinue the supply of power to the component comprising the component upgrade.

Applicants' method transitions from step 680 to step 690 wherein the method resumes the supply of power to the component comprising the component upgrade. In certain embodiments, step 690 further comprises generating a power connect signal by the control portion, and providing that power connect signal to the power regulator disposed in the component comprising the component upgrade. In certain embodiments, step 690 is performed by a processor, such as processor 132 (FIGS. 1, 3, 4, 5), disposed in the controller, such as controller 200. In certain embodiments, step 690 includes providing a signal from a host computer, such as host computer 390 (FIG. 1), to the local processor, such as processor 132, to resume the supply of power to the component comprising the component upgrade.

Applicants' method transitions from step 690 to step 695 wherein the component comprising the component upgrade accepts the new instructions, and/or functions, and/or microcode, provided in step 670. Applicants' method transitions from step 695 to step 620 and continues as described herein.

In certain embodiments, Applicants' information storage and retrieval system, such as system 100 (FIG. 1), includes two clusters, such as clusters 101 and 111, wherein each of those clusters includes a controller such as controller 200A (FIG. 5) and controller 200B (FIG. 5). Applicants' invention further includes embodiments wherein each controller monitors the performance of the other controller.

Figure 7:
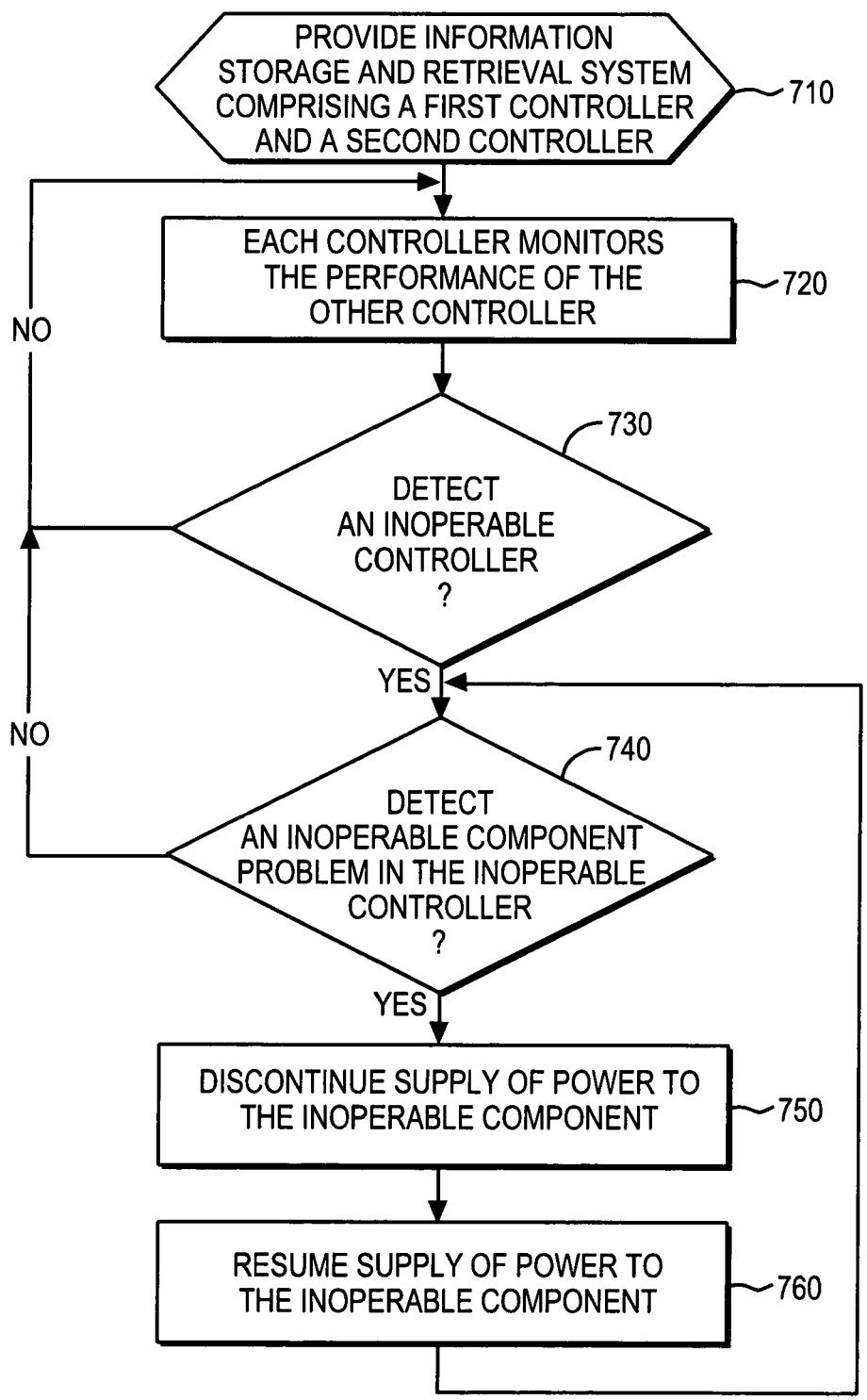
FIG. 7 is a flow chart summarizing the steps of a second embodiment of Applicants' method.

Referring now to FIG. 7, in step 710 Applicants' method provides an information storage and retrieval system which comprises two controllers, such as controllers 200A and 200B. In step 720, each controller monitors the operation of the other controller. In certain embodiments, step 720 includes providing, at regular intervals by a first controller, such as controller 200A, a "heart beat" signal to a second controller, such as controller 200B. Upon receiving that heart beat signal, the second controller sends a responding heart beat signal to the first controller.

As long as each controller continues to receive a responding heart beat signal from the other controller, then each controller determines that the other controller is operational. If one controller does not receive a responding heart beat signal from the other controller, then that controller determines that the other controller is no longer operational.

Applicants' method transitions from step 720 to step 730 wherein Applicants' method detects an inoperable controller. In certain embodiments, step 730 comprises generating by each controller, and providing at regular intervals to the other controller, a heart beat signal. In these embodiments, the absence of a responding heart beat signal indicates an inoperable controller, wherein "inoperable" is described above.

If Applicants' method detects an inoperable controller in step 730, then Applicants' method transitions from step 730 to step 740 wherein the operational controller monitors the performance of each component comprising the inoperable controller. In certain embodiments, step 740 is performed by a processor disposed in the operational controller. In certain embodiments, the operational controller performs the steps recited in FIG. 6 to monitor the performance of components comprising that operational controller in addition to monitoring the performance of each component comprising the inoperable controller.

If the operational controller does not detect an inoperable component disposed in the inoperable controller, then the method transitions from step 740 to step 720 and continues as described herein. Alternatively, if the operational controller does detect an inoperable component disposed in the inoperable controller, then the method transitions from step 740 to step 750 wherein the operational controller discontinues the supply of power to the inoperable component. In certain embodiments, step 750 further comprises generating a power disconnect signal by the operable controller, and providing that power disconnect signal to the power regulator disposed in the inoperable component. In certain embodiments, step 750 is performed by the operational controller. In certain embodiments, step 750 includes providing a signal from a host computer, such as host computer 390 (FIG. 1), to the operational controller to discontinue the supply of power to the inoperable component.

Applicants' method transitions from step 750 to step 760 wherein the method resumes the supply of power to the inoperable component. In certain embodiments, step 760 further comprises generating a power connect signal by the operational controller, and providing that power connect signal to the power regulator disposed in the inoperable component. In certain embodiments, step 760 is performed by the operational controller. In certain embodiments, step 760 includes providing a signal from a host computer, such as host computer 390 (FIG. 1), to the operational controller to resume the supply of power to the inoperable component.

In certain embodiments, the inoperable component comprises a field programmable gate array and a nonvolatile memory device. In these embodiments, steps 760 further comprises reading logic configuration data disposed in the memory device, and loading a logic configuration into the field programmable gate array. Applicants' method transitions from step 760 to step 740 and continues as described herein.

The embodiments of Applicants' method recited in FIGS. 6 and/or 7, may be implemented separately. Moreover, in certain embodiments, individual steps recited in FIGS. 6 and/or 7, may be combined, eliminated, or reordered.

In certain embodiments, Applicants' invention includes instructions residing in the memory, such as memory 133 (FIG. 1), of a control portion, such as control portion 130, of a controller, such as controller 200, where those instructions are executed by a processor, such as processor 132 (FIG. 1), to perform steps 620, 630, 640, 650, 660, 670, 680, 690, and/or 695, recited in FIG. 6, and/or steps 720, 730, 740, 750, and/or 760, recited in FIG. 7.

In other embodiments, Applicants' invention includes instructions residing in any other computer program product, where those instructions are executed by a computer external to, or internal to, system 100, to perform steps 620, 630, 640, 650, 660, 670, 680, 690, and/or 695, recited in FIG. 6, and/or steps 720, 730, 740, 750, and/or 760, recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to selectively provide power to a component disposed in an information storage and retrieval system, comprising the steps of:
   supplying a controller comprising a control portion in combination with a plurality of components comprising one or more host adapter ports, one or more device adapter ports, and a Fibre Channel switch;
   monitoring the performance of each of said plurality of components;
   determining if a microcode upgrade has been received for a first component;
   operative if a microcode upgrade for said first component has been received, providing said microcode upgrade to said first component prior to discontinuing the supply of power to said first component;
   discontinuing the supply of power to said first component while continuing the supply of power to the remaining plurality of components;
   resuming the supply of power to said first component while continuing the supply of power to the remaining plurality of components.

2. A method to selectively provide power to a component disposed in an information storage and retrieval system, comprising the steps of:
   supplying an information storage and retrieval system comprising two controllers, wherein each of those two controllers comprises a control portion in combination with a plurality of components comprising one or more host adapter ports, one or more device adapter ports, and a Fibre Channel switch, and wherein each of those two controllers are capable of communicating with the other controller, wherein the supply of power to each of the plurality of components disposed in either controller can be discontinued and subsequently resumed while the supply of power remains uninterrupted to the remaining plurality of components;
   monitoring the performance of each of said plurality of components;
   discontinuing the supply of power to a first component while continuing the supply of power to the remaining plurality of components;
   resuming the supply of power to said first component while continuing the supply of power to the remaining plurality of components;
   monitoring by each of said two controllers the performance of the other controller;
   detecting an inoperable controller;
   monitoring the performance of the plurality of components comprising said inoperable controller by the operational controller;
   detecting an inoperable component disposed in said inoperable controller by said operable controller;
   discontinuing the supply of power to said inoperable component by said operable controller while continuing the supply of power to the remaining plurality of components disposed in said inoperable controller;
   resuming the supply of power to said inoperable component by said operable controller while continuing the supply of power to the remaining plurality of components disposed in said inoperable controller.

* * * * *